INVENTORS
CHARLES W. MUELLER
BY & LOY E. BARTON
W.S. Hill
AGENT 2,968,751

SWITCHING TRANSISTOR

Charles W. Mueller and Loy E. Barton, Princeton, N.J., assignors to Radio Corporation of America, a corporation of Delaware Filed Aug. 9, 1957, Ser. No. 677,295

9 Claims. (Cl. 317—235)

This invention relates generally to semiconductor devices suitable for high speed switching applications and, more specifically, to a particular form of transistor suitable for this purpose.

Under ideal conditions, a device used for switching purposes should have infinite resistance to current flow in the switch "open" condition and substantially zero resistance in the switch "closed" condition. For high speed switching, it is further desirable that the device be able to be turned on or off with pulses of potential of brief duration and relatively low magnitude.

Ordinary junction transistors, either n-p-n or p-n-p, can be made to operate as switches but they have some disadvantages which it is desirable to avoid. In the "off" (open) condition, the collector current is not completely absent but, at least, is very low, being of the order of a few microamperes. This does not usually introduce any difficulties in circuit operation. However, in the "on" (closed) condition, with the emitter electrode region biased in the forward condition with respect to the base region, in order to get high values of collector current, it is necessary to maintain a fairly high collector voltage, at least of the order of a few volts. It is also necessary to maintain a relatively high base current in order to keep the transistor in the "on" condition as a switching device. If the base current is removed, or lowered substantially, the output current either ceases completely or drops to an undesirably low value. Thus, the device cannot be operated by pulsing.

Although some improvement in operation as a switch has been found in transistors that can be made to operate with the so-called "avalanche" effect, even this type of operation requires relatively high collector-emitter or collector-base voltages, i.e., of the order of tens of volts, to keep the device in the "on" condition, and this results in considerable heat being generated and consequent power loss. The heat must be dissipated rapidly so as not to interfere with the stability of the device and this introduces further design problems.

One object of the present invention is to provide an improved transistor particularly suitable for high speed switching operation.

Another object of the invention is to provide an improved switching transistor requiring a relatively low sustaining collector-emitter and collector-base voltage in the "on" condition.

A further object of the invention is to provide a switching transistor with relatively rapid response to a signal for turning it to "on" condition.

Another object of the invention is to provide an improved semiconductor switching device that can be operated by pulsing.

A still further object of the invention is to provide an improved switching device with operation comparable to thyratron action but with the additional advantage that it can be turned off by voltage pulsing.

A particular feature of the present invention is that an improved semiconductor device is provided capable of accomplishing the aforementioned objects. This device comprises a base region of one conductivity-type crystalline semiconducting material, an emitter electrode in rectifying contact with one portion of the base region, a collector region of opposite-conductivity type to that of the base region in rectifying contact with another portion of the base region, and means adapted to collect charge carriers which are minority carriers with respect to the base region, at low collector currents and adapted to inject charge carriers which are majority carriers with respect to the base region, into the collector region at higher collector currents, in contact with the collector region. Where amplification as well as fast switching action is desired, the device includes a base electrode connected to the base region in non-rectifying contact. The three-electrode form of the device may be operated as an ordinary transistor at low collector currents but, as the collector current is increased by increasing the forward base-to-emitter bias, a value is reached where triggering occurs and a high current flows. A short voltage pulse applied between emitter and base electrodes may be used to switch the device to the high conductivity mode. The polarity of the pulse depends upon whether the device is p-n-p or n-p-n. After reaching the high current, or negative resistance, region, the base current from the external source can be removed without affecting the collector current. However, by applying a voltage pulse between emitter and base, which has a polarity opposite to the "turn on" pulse, the high current can be triggered off. In addition to operating as a high speed switch, the device has many other applications, for example, in a self-excited blocking oscillator circuit or a frequency divider circuit.

A preferred embodiment of the improved device, a method of manufacture, and improved circuits which illustrate mode of operation will now be more particularly described with the aid of the drawing, in which like parts of the various figures are designated with the same numerals.

Figure 1:
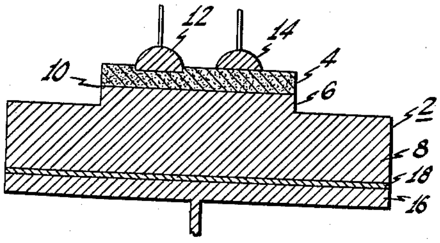
Fig. 1 is an elevation cross-section view taken longitudinally through one embodiment of a device made in accordance with the present invention.
Figure 3A:
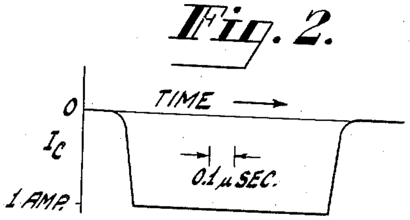

Fig. 3*a* is a plot of collector current against time for the device of Fig. 1, indicating the brief rise time needed to reach the high-conducting stage of operation and the brief time required to drop back to the low-conducting state.

Figure 3B:
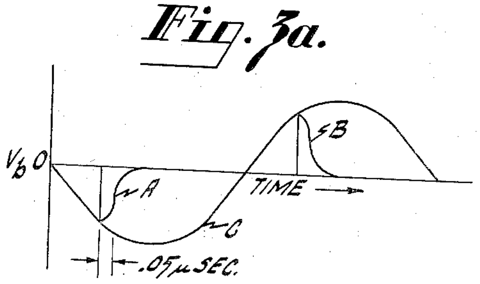

Fig. 3*b* is a plot of base voltage against time on the same time scale as that of Fig. 3*a* indicating how pulsing or wave signals may be used to accomplish switching in the present device.

Figure 4:
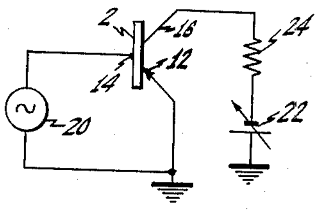

Fig. 4 is a schematic circuit diagram of a switching circuit utilizing the device of Fig. 1.

Figure 5:
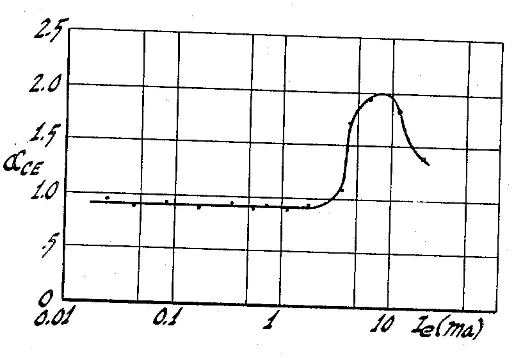

Fig. 5 is a graph showing how $\alpha_{ce}$ varies with emitter current in the device of the invention.

Figure 6:
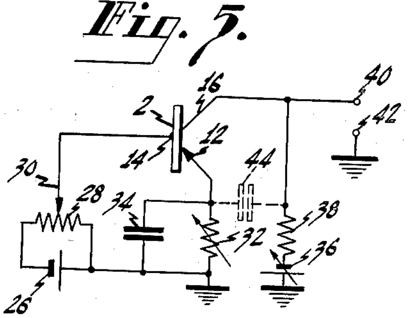

Fig. 6 is a schematic circuit diagram of an improved blocking oscillator utilizing the device of Fig. 1.

Figure 7:
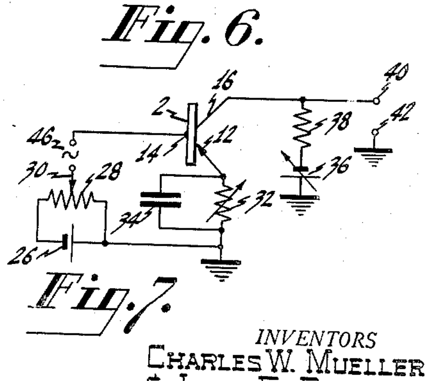

Fig. 7 is a schematic circuit diagram of an improved frequency divider utilizing the device of Fig. 1.

Referring now to Figure 1, a preferred embodiment of a switching transistor in accordance with the present invention comprises a germanium body 2, of which a layer or region 4, 0.1 mil thick and 12 mils in diameter, disposed on the top of a plateau portion 6 of the body constitutes the base region. This region is made n-type by diffusing arsenic into the body from the outer surface thereof. A region 8 of 3 ohm-cm. p-type conductivity adjoins the base region and is separated therefrom by a rectifying barrier 10. This region which is 5 mils in thickness, serves as the collector region and its p-type conductivity may be provided by doping with indium or other p-type impurity. An emitter rectifying electrode 12, 4 mils in diameter, is surface alloyed to one portion of the base region 4 and a base electrode 14 is ohmically connected to another portion of the base region, preferably very close to the emitter electrode. The emitter may be composed of an alloy of 99.6% indium and 0.4% aluminum. The base electrode may be composed of a 49% lead, 49% tin, 2% antimony solder.

A particular feature of the device of the present invention is a particular type of electrode soldered to the collector region, this electrode in this example of a p-n-p device, being adapted to collect holes at low values of collector current but adapted to inject electrons at collector currents above this low value. In the present preferred embodiment, this electrode comprises a nickel tab 16 soldered to the collector region with a particular solder composition 18 composed of 49% lead and 49% tin with 2% indium. The composition of the tab metal is not especially important. The solder is composed of a minor proportion of a metal which is a p-conductivity type determining impurity for the collector region 8 and the bulk proportion being of metals which are neither n- nor p-type impurities with respect to the collector region. Tests have shown that the electrode is non-rectifying, that is, there is no rectifying barrier present, hence the device is not a p-n-p-n structure.

Conventional methods are used in the manufacturing steps. Briefly, these are as follows. A wafer of p-type germanium is subjected to a diffusion treatment with the arsenic impurity in order to cause traces of the arsenic to pentrate a surface layer of about 0.1 to 0.2 mils thick over the entire surface of the wafer. This is accomplished by heating in the presence of a source of arsenic either in a vacuum, or within the confines of a jig having a very small air space, for one hour at 800° C. The layer into which the arsenic has diffused is then etched away except for the base region 4 which it is desired to leave in the finished device. This is done by protecting the area which it is not desired to etch with Ceresine wax and etching off the remainder of the surface layer with a solution made up by adding 1 drop of a 0.55% aqueous solution of potassium iodide to 1 liter of a solution made up of 600 cc. conc. nitric acid, 300 cc. glacial acetic acid, and 100 cc. 48% hydrofluoric acid. Etching time is about one minute or slightly longer. After removing the etching solution by rinsing, and then drying, the wax which had been protecting the base region is removed with benzene and the entire crystal is given an additional etch in the same etching solution for about 15 seconds, after which it is rinsed in distilled water. At this stage, the unit comprises the p-type collector region 8 with a plateau 6 of the same type of germanium surmounted by the base region 4.

The emitter electrode 12 is next attached by placing a small cleaned square of indium-aluminum alloy (0.4% aluminum) coated with a small amount of a conventional aluminum flux on a portion of the base region. The indium-aluminum alloy square is .003″ on a side. The unit, thus far assembled, is then heated in dry hydrogen at 450° C. for 3 minutes and cooled over a period of 20 minutes to 300° C. after which it is allowed to cool to room temperature. Any flux residue is rinsed off in hydrochloric acid and the acid is then rinsed off in distilled water and the unit is dried. Next, the base electrode is attached by placing a small square of 49% lead, 49% tin, 2% antimony solder on the end of a tinned platinum wire which has first been dipped in flux, heating the solder enough to cause it to ball up and attach itself to the platinum wire. The solder ball on the tip of the wire is then dipped in flux and placed as closely as possible to the emitter electrode on the base region and the unit is heated in dry hydrogen to 425° C. for 2 minutes, and then cooled.

The nickel electrode 16 is then atached to the collector region by coating one side of a nickel tab with 49% lead, 49% tin, 2% indium solder, placing the coated side in contact with the surface of the collector region of the crystal and heating in dry hydrogen to 300° C. for 2 minutes.

Various changes can be made in the construction of the device without materially changing the operation which will be described later. For example, the emitter electrode does not necessarily have to be surface alloyed to form a re-crystallized region but can be a surface barrier rectifying electrode. The base region is also not limited to the configuration illustrated and described. As shown, the base region has its impurity concentration graded from the more concentrated outer surface to the less concentrated inner surface adjacent the rectifying barrier. This is a preferred form, but the device operates in substantially the same manner if the impurity concentration is uniform throughout the base or if the impurity is introduced in other ways. If no amplification is desired, the base electrode can be omitted entirely. The device will then operate as a switch but not as an amplifier. An n-p-n as well as a p-n-p configuration can be used.

The solder used in attaching the special electrode to the collector region is of importance since it apparently helps to determine the electrical properties of this electrode. The proportion of indium in the solder can be varied considerably. Using a solder containing 2% indium as illustrated, triggering occurred at 3 ma. base current. If 10% indium is used, the breakdown current is higher, being about 5 ma. Both pure indium solder and pure lead solder were each tried as a substitute for the lead, tin, indium solder but in neither case was any triggered current region found. If an n-p-n unit is constructed, the special electrode solder can be composed of 49% lead, 49% tin and 2% arsenic or antimony or other element of Group V*a* of the periodic table.

Figure 2:
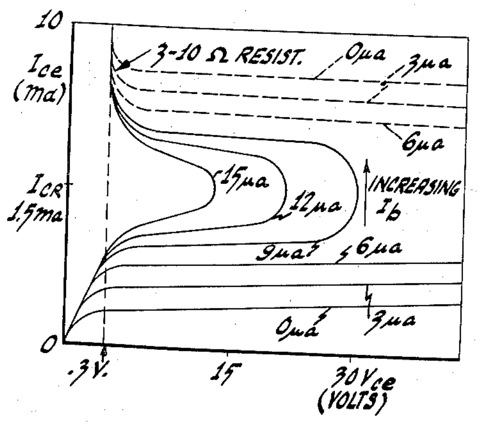
Fig. 2 is a graph showing how collector-emitter current is related to collector-emitter voltage with increasing values of base current for the device of Fig. 1.

Operational curves for the use of the device as a high current, high speed switch are shown in Figure 2. These curves are for the device described in the preferred embodiment. As shown in the figure, at low values of base current and low values of collector-emitter voltage, the device operates as an ordinary transistor with collector-emitter current rising gradually with increasing collector-emitter voltage. However, even at zero base current, if the collector-emitter voltage is made high enough (for this device it was about 60 volts) a breakdown in resistance occurs due to avalanching effect and the device jumps abruptly to a high-collector-emitter current state. As the base current is increased, the collector-emitter voltage at which triggering occurs becomes much smaller, so that, as shown in the figure, for 9 $\mu$a. base current the triggering voltage is about 30 and for 12 $\mu$a. the voltage is about 20. In this region an effect different from avalanching is occurring. This effect will be explained in more detail later.

Part of the improved operation of the device lies in the fact that, after the high current region is reached, the base current can be reduced to zero without affecting the collector current and the high collector current can be sustained with very moderate values of collector-emitter voltage. In the present example, this latter voltage value is 0.3 to 0.5. v.

Another important advantage is that, in the high conductance mode, the device displays a low series resistance (3–10 ohms in the example), and, in the example, for 100 ma. of collector current, the voltage drop is only 0.5 v. This results in very low power dissipation at high conductance.

Some of the characteristics of operating the device of the present invention as a switching transistor are shown in Figures 3*a* and 3*b*. A circuit for utililizing the device as a switch is illustrated in Figure 4. Figures 3*a* and 3*b* are plotted on the same time base. As shown in Figure 3*a*, collector current may be made to rise abruptly, continued for any desired length of time and then dropped abruptly back to its former level. Methods of accomplishing the switching action are indicated in Figure 3*b*. To turn the device on, a pulse of negative voltage with peak power of about 50 mw., or even less in some cases, as indicated by the "spike" pulse A, can be utilized to trigger the device "on." Rise time to the conduction mode is very short, being about 0.1 microseconds. The length of the pulse can be about 0.05 microseconds. After any desired length of time, a similar pulse B but in the opposite sense as to polarity, that is, a positive voltage pulse, can be applied to turn the switch "off." Because of storage effects, the high charge densities in the active region under the emitter must be altered to apply a reverse bias at the emitter junction. Since there is considerable base lead resistance, this effort is hindered. By using considerable turn off power, for example, 20 volts from a 50 ohm source, it is possible to turn off the device in 0.04 microseconds. For a more reasonable driving power, that is 8 volts from 50 ohms, the total turn off time is about 0.1 microseconds.

Other wave forms can be used to effect the switching operation. For example, as shown by the curve C of Figure 3*b*, a sine wave can be used, the device turning on when the sine wave voltage reaches the proper value in the negative direction and turns off when it reaches the proper value in the positive direction. Square wave pulses can also be used.

A circuit utilizing the device of the present invention as a high speed switch is shown in Figure 4. As shown in the figure, the switching transistor is connected so that a signal source 20 is connected between its base electrode 14 and its emitter electrode 12. The emitter lead is grounded. The negative side of a biasing battery 22 is connected to the special collector connection electrode 16 through a load resistor 24, which may have a value of 50 to 200 ohms. The positive side of the battery, which may have adjustable values of 1.5 to 20 volts, is connected to ground. The signal source may, as explained previously above, be a source of sine wave potential or other waveforms or it may be a source of brief square wave pulses. Since the collector voltage can be even greater than 20 volts, the peak output power that the embodiment device illustrated can handle as a switch is of the order of 10 to 20 watts.

As previously indicated, most of the improved operation of the present device, is due to the special electrode connected to the collector region. This electrode, in the p-n-p device of the example, has the property of being adapted to collect holes at low values of collector current, but inject electrons at higher values of collector current.

Figure 5 shows $\alpha_{ce}$ as a function of emitter current for the present device. When $\alpha_{ce}$ equals or exceeds unity in the grounded emitter circuit, operation takes place in the high conductance mode. As the curve of the figure shows, when $\alpha_{ce}$ begins to rise, it increases very rapidly with emitter current. This total $\alpha_{ce}$ can be broken up into two parts, $\alpha_{holes}$, which expresses the hole current transfer ratio across the base for holes injected at the emitter, and $\alpha_{electrons}$, the electron current transfer ratio across the collector body for electrons injected in the special collector connection. When the hole $\alpha$ and electron $\alpha$ are measured separately, the electron $\alpha$ is found to be very small at low values of emitter current. However, it increases very rapidly at critical values of emitter current. Between 1 ma. and 5 ma., an increase of two orders of magnitude occurs.

When the device triggers over into the high conductance mode, the junctions have effectively disappeared. There is an injection of holes from the emitter and an injection of electrons from the collector contact in about equal numbers. At high current densities (above 10 ma. emitter current), hole current injected by the emitter decreases causing the combined hole and electron alpha to drop.

Although it is not desired to be limited thereby, an explanation will be given of the manner in which the special collector electrode injects large electron currents. For small values of collector current, it is postulated that holes tunnel through the potential barrier and there is a small but finite impedance at the interface (in addition to the series body resistance). As the hole current increases, the barrier height is decreased. The electron current, which is in terminal equilibrium under condition of zero flow, is increased as the barrier is decreased. Since the electron and hole currents display different dependences on the barrier height (owing to the different mechanisms involved), there is a change in the relative proportion of hole to electron currents as the total current increases.

The device of the present invention has some characteristics similar to those of a "hook" type p-n-p-n device but there are also some important differences. The "hook" type transistor can have a negative resistance characteristic similar in form to that shown in Fig. 2, but break-over current, switching speed, and operating temperature range differ considerably. The differences stem from the nature of the electron injector electrode.

For comparison purposes, a p-n-p-n "hook" type transistor was built having a geometry like the device shown in Figure 1 except that the collector connection was a lead-arsenic eutectic mixture alloyed at 600° C. instead of the lead, tin, indium electrode of the illustrated embodiment of the present invention. Thus an n-type region was produced on the exposed surface of the p-type collector region. With this structure, the type of characteristic shown in Figure 2 could not be produced since break-over to the high conductivity mode occurred at very low currents. Typical values for the point of break-over under D.C. conditions were:

$$I_b \approx 1\text{–}10 \text{ ma.}; \; I_{CB} \approx 10\text{–}50 \text{ ma.}$$

The low break-over current of the p-n-p-n device causes two operating difficulties. First, the allowable temperature range is greatly reduced because of the increase of collector current with temperature. Since breakdown occurs at a low value of collector current, for example, the top operating temperature with zero base current is very low, about 35° C. compared to 65° C. for typical units of the present invention. Second, the low value of break-over current is accompanied by a very small field across the collector body and, consequently, the field acceleration of the minority carriers through the collector will not be very effective. The speed of response depends almost entirely on diffusion flow in the p-n-p-n unit and therefore to obtain fast speed of response a much thinner collector body is necessary than with the device of the present invention.

Some improved circuits using devices of the present invention will now be described.

Figure 6 shows a circuit in which a device of the present invention is used as a self-excited blocking oscillator. To provide a variable or adjustable biasing voltage source for the base electrode 14, the negative terminal of a battery 26 is connected to the base electrode through a potentiometer comprising a voltage dividing resistor 28 and an adjustable tap 30. The battery must provide base biasing voltage high enough, e.g., 0.4 to 0.5 volts, to cause the collector current to rise into the negative resistance region. To set the time constant of the oscillator, the emitter 12 of the transistor is connected to a resistive-capacitive time constant network consisting of a variable resistor 32 connected between the emitter and a source of reference potential, in this case ground, and a capacitor 34 connected in parallel with the resistor. The collector connection electrode is negatively biased by means of a battery 36, which may have values of 3 to 20 volts, connected thereto through a resistor 38 which may have a value of 50 to 200 ohms. The positive terminal of the battery is connected to ground. The collector electrode is connected to an output terminal 40, the other output terminal 42 being connected to ground. In operation, before the collector current starts, the voltage on the time constant capacitor 34 is low and, as the current does start, the emitter is momentarily held at or near ground potential. Therefore, the trigger current reaches its maximum value and stays there until the capacitor becomes charged to the extent that the effective base bias causes the collector current to decrease, at which time the collector current is triggered off. The voltage remaining on the capacitor then keeps the collector current off. The current stays off until the bucking charge on the capacitor decreases to a value such that the voltage between the emitter and base may again cause the collector current to be triggered. The repetition rate depends primarily on the time constant of the combination of the resistor 32 and capacitor 34, and, to some extent, on the emitter-to-base voltage and on the collector voltage. If the resistor 32 is about 100 ohms, and the capacitor 34 about .02 mfd., the repetition rate may be in the 1 megacycle range for the particular transistor used. A capacitor 44 may be connected between the emitter and collector instead of the capacitor 34 or in conjunction with it to produce other effects. If capacitor 44 only is used, the output becomes a spike instead of a more or less square-top pulse. A resistance in series with the base electrode is equivalent to reducing the base voltage and if this is high enough, oscillation is prevented.

Figure 7 shows a device of the present invention used in a circuit for a frequency divider. This circuit is similar to that shown in Figure 6 except that a signal source 46 is connected between the dividing resistor tap 30 and the base electrode 14 of the transistor. In this circuit, the biasing resistor 38 may have a value of 50 to 200 ohms and the battery 36 may have output values between 1.5 volts and 20 volts. The biasing potential for the emitter, in conjunction with the capacitor 34 and resistor 32 are made to cause a pulse such that a pulse and blank will include the number of signal cycles to be in the final or divided frequency. The signal, or the frequency to be divided, is applied between the base and emitter as indicated and minor adjustments of signal voltage, collector to base voltage and the resistance across the capacitor 34 are made until the desired dividing number is obtained. As the dividing number increases, the adjustments become more critical. However, a division of 10 to 20 is practical. A 3.6 megacycle signal was divided by 13 and could be changed up or down in steps of one. Since the output of this multiplier is high, succeeding divider stages may be driven without intermediate amplification.

What is claimed is:

1. A semiconductor device comprising a base region of one type conductivity crystalline semiconducting material, an emitter electrode in rectifying contact with one portion of said base region, a collector region of conductivity type opposite that of said base region in rectifying contact with another portion of said base region, and electrode means in contact with said collector region, said electrode means being responsive to predetermined low collector currents to collect charge carriers which are minority carriers with respect to said base region, and responsive to collector currents higher than said low currents to inject charge carriers which are majority charge carriers with respect to said base region, into said collector region; said means comprising a solder including a minor proportion of a material which when present in small quantities in said semiconductor produces therein said one type conductivity, and a major proportion of materials which when present in small quantities in said semiconductor do not produce a particular type conductivity.

2. A semiconductor device comprising a base region of one conductivity type crystalline semiconducting material, an emitter electrode in rectifying contact with one portion of said base region, a collector region of conductivity type opposite to said one type in rectifying contact with another portion of said base region, and means adapted to collect charge carriers which are minority carriers with respect to said base region, at predetermined low collector currents, and adapted to inject charge carriers which are majority carriers with respect to said base region, at higher collector currents, into said collector region; said means comprising a solder including a minor proportion of a material which when present in small quantities in said semiconductor produces therein said one type conductivity, and a major proportion of materials which when present in small quantities in said semiconductor do not produce a particular type conductivity.

3. A semiconductor device comprising a base region of n-conductivity type crystalline semiconducting material, an emitter electrode in rectifying contact with one portion of said base region, a collector region of p-conductivity type in rectifying contact with another portion of said base region, and metallic electrode means adapted to collect holes from said collector region at low collector currents and adapted to inject electrons into said collector region at higher collector currents, in contact with said collector region; said means comprising a solder including a minor proportion of a material which when present in small quantities in said semiconductor produces therein n-type conductivity, and a major proportion of materials which when present in small quantities in said semiconductor do not produce a particular type conductivity.

4. A semiconductor device comprising a base region of n-type crystalline semiconducting material, an emitter electrode in rectifying contact with one portion of said base region, a collector region of p-conductivity type in rectifying contact with another portion of said base region, and means adapted to collect holes from said collector region at predetermined low values of collector currents and adapted to inject electrons into said collector region at values of collector currents higher than said predetermined low values, in contact with said collector region said means comprising a solder including a minor proportion of indium, and a major proportion of lead and tin.

5. A semiconductor device comprising a base region of n-conductivity type crystalline semiconducting material having an impurity concentration which decreases from one side toward an opposed side thereof, an emitter electrode comprising a region of p-type conductivity in rectifying contact with the high impurity concentration side of said base region, a base electrode in ohmic contact with said base region on the high impurity concentration side thereof, a p-type collector region in rectifying contact with the low impurity concentration side of said base region, and means adapted to collect holes from said collector region at low collector currents and adapted to inject electrons into said collector region at higher collector currents, in contact with said collector region.

6. A semiconductor device comprising a semiconductor body having a base region of one type conductivity, said region having a graded impurity distribution with highest impurity concentration adjacent one side and lowest impurity concentration adjacent the side opposite said one side, a rectifying electrode capable of readily injecting charge carriers which are minority carriers with respect to said base region, into said base region, and connected to the high impurity side thereof, a base electrode ohmically connected to said base region in close proximity to said rectifying electrode, a collector region of opposite conductivity type in rectifying contact with the low impurity side of said base region, and an electrode adapted to collect said minority charge carriers at low values of collector current and adapted to inject charge carriers which are majority carriers with respect to said base region, in non-rectifying contact with said collector region.

7. A semiconductor device comprising a germanium body of p-type conductivity having on one surface thereof a thin base region of n-type conductivity, a p-type electrode region fused to said n-type region, a base electrode ohmically connected to said n-type region closely spaced to said p-type electrode, and an electrode soldered to an opposed surface of said p-type body adapted to collect holes at low values of collector current but adapted to inject electrons at collector currents above said low values; the solder for said electrode consisting essentially of a minor proportion of indium up to 10 percent and a major proportion of lead and tin.

8. A semiconductor device comprising a germanium body of p-type conductivity having on one surface thereof a thin base region of n-type conductivity, said region having a graded impurity distribution with lowest concentration of impurity adjacent said p-type body and highest concentration remote from said body, a p-type electrode region fused to said n-type region, a base electrode ohmically connected to said n-type region closely spaced to said p-type electrode, and an electrode connected in non-rectifying contact to an opposed surface of said p-type body adapted to collect holes at low values of collector current and adapted to inject electrons at collector currents above said low values.

9. A semiconductor device comprising a germanium body of p-type conductivity having on one surface thereof a thin base region of n-type conductivity, said region having a graded impurity distribution with lowest concentration of impurity adjacent said p-type body and highest concentration remote from said body, a p-type electrode region fused to said n-type region, a base electrode ohmically connected to said n-type region, and an electrode composed predominantly of neutral metals and a minor proportion of p-type impurity metal soldered in non-rectifying contact to an opposed surface of said p-type body adapted to collect holes at low values of collector currents but adapted to inject electrons at collector currents above said low values.

References Cited in the file of this patent

UNITED STATES PATENTS

| | | |
|---|---|---|
| 2,795,744 | Kircher | June 11, 1957 |
| 2,806,983 | Hall | Sept. 17, 1957 |
| 2,810,870 | Hunter et al. | Oct. 22, 1957 |
| 2,820,932 | Looney | Jan. 21, 1958 |
| 2,821,493 | Carman | Jan. 28, 1958 |
| 2,840,494 | Parker | June 24, 1958 |
| 2,842,831 | Pfann | July 15, 1958 |